US008732331B2

(12) United States Patent
Lesartre et al.

(10) Patent No.: US 8,732,331 B2
(45) Date of Patent: May 20, 2014

(54) MANAGING LATENCIES IN A MULTIPROCESSOR INTERCONNECT (75) Inventors: Gregg B Lesartre, Fort Collins, CO (US); Craig Warner, Richardson, TX (US); Gary Gostin, Plano, TX (US); John W Bockhaus, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 315 days.

(21) Appl. No.: 13/122,331

(22) PCT Filed: Oct. 2, 2008

(86) PCT No.: PCT/US2008/078621
§ 371 (c)(1),
(2), (4) Date: Apr. 1, 2011

(87) PCT Pub. No.: WO2010/039143
PCT Pub. Date: Apr. 8, 2010

(65) Prior Publication Data
US 2011/0179423 A1     Jul. 21, 2011

(51) Int. Cl.
*H04L 12/801* (2013.01)
(52) U.S. Cl.
USPC ............................ 709/235; 370/236; 370/412
(58) Field of Classification Search
CPC ......... H04L 12/26; H04L 12/28; H04L 12/50; H04L 12/56; H04Q 7/20; G06F 9/46

USPC .................................. 709/201–253; 718/104
See application file for complete search history.

(56) References Cited

U.S. PATENT DOCUMENTS

| 7,633,955 | B1 * | 12/2009 | Saraiya et al. ................. 370/401 |
| 7,843,906 | B1 * | 11/2010 | Chidambaram et al. ...... 370/386 |
| 2001/0055277 | A1 | 12/2001 | Steely et al. |
| 2002/0087723 | A1 | 7/2002 | Williams et al. |
| 2004/0064508 | A1 * | 4/2004 | Ayyagari et al. .............. 709/205 |
| 2004/0170127 | A1 | 9/2004 | Tanaka |
| 2005/0187891 | A1 * | 8/2005 | Johnson et al. .................... 707/1 |
| 2007/0121499 | A1 * | 5/2007 | Pal et al. ........................ 370/230 |
| 2009/0063880 | A1 * | 3/2009 | Arimilli et al. ............... 713/320 |
| 2009/0247204 | A1 * | 10/2009 | Sennett et al. ................ 455/512 |

FOREIGN PATENT DOCUMENTS

WO    WO 2007072544    6/2007

OTHER PUBLICATIONS

International Search Report and Written Opinion, dated May 18, 2009, 13 pages.

* cited by examiner

*Primary Examiner* — Andrew Chriss
*Assistant Examiner* — John Lequang (57) ABSTRACT In a computing system having a plurality of transaction source nodes issuing transactions into a switching fabric, an underserviced node notifies source nodes in the system that it needs additional system bandwidth to timely complete an ongoing transaction. The notified nodes continue to process already started transactions to completion, but stop the introduction of new traffic into the fabric until such time as the underserviced node indicates that it has progressed to a preselected point.

13 Claims, 5 Drawing Sheets

MANAGING LATENCIES IN A MULTIPROCESSOR INTERCONNECT

The disclosure relates to architectures for use in computer systems that have a plurality of nodes, each node comprising a transaction source, wherein the nodes intercommunicate via a system switching fabric.

By their nature, computing nodes in a large computer system do not necessarily provide equal access to all other nodes in the system. Nodes closer to a destination node can tend to get a larger share of the bandwidth of that destination node than other nodes farther away. Because of this, in scenarios where there is a lot of congestion in the system fabric, nodes farther away may experience unacceptably long response times (latencies). Such excessively long latencies may ultimately lead to system failure as components in the system or the operating system (OS) give up on the slow transactions.

In the prior art, one solution to this problem is limiting the overall system size. The problem can also be managed by pre-allocating available bandwidth, but that leaves bandwidth unused if all nodes do not need their allocations, as can be the case for example in partitioned systems. Another prior art solution is to increase the number of virtual channels for communication between nodes. Although that can mitigate the latency problem, it incurs an additional cost, because additional virtual channels require additional buffering and control resources in the fabric.

What is needed is a way to better manage latency in a computer system comprising a plurality of transaction source nodes that ameliorates the shortcomings of existing practices.

SUMMARY

An underserviced transaction source node in a multiprocessor computing system notifies other nodes in the system that it is not receiving enough of the system bandwidth to timely complete an ongoing transaction. Other nodes in the system continue to allow traffic required to complete already started transactions, but stop generating new traffic into the fabric, until such time as the underserviced node indicates that it has made acceptable progress. Thereby, the rare but catastrophic problem of a system failure resulting from excessively long communication latencies can be avoided without imposing high additional costs in terms of system area, power, or complexity.

It is to be understood that both the foregoing general description and the following detailed description are exemplary and explanatory and are intended to provide further explanation of the methods and systems recited in the claims.

BRIEF DESCRIPTION OF THE DRAWINGS

The accompanying drawings, which are included to provide a further understanding of the disclosure and are incorporated in and constitute a part of this specification, illustrate the disclosed embodiments and together with the description serve to explain the principles of the disclosed methods and systems.

In the drawings.

DETAILED DESCRIPTION

Illustrative Computing Environment

Figure 1:
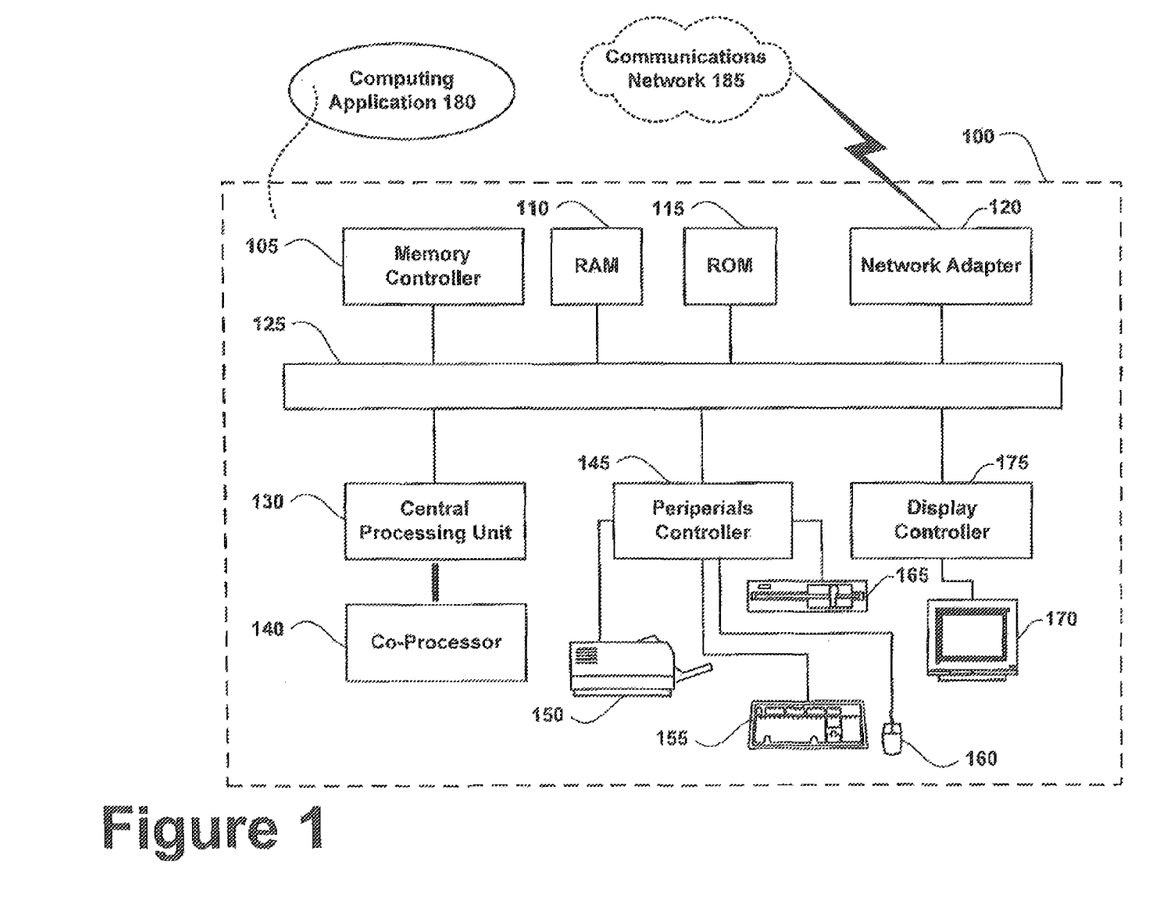
FIG. 1 is a block diagram of an exemplary computing environment in accordance with an implementation of the herein described systems and methods.

FIG. 1 depicts an exemplary computing system 100 such as can form a portion of an exemplary multiprocessor computing environment in accordance with herein described system and methods. Computing system 100 is capable of executing a variety of computing applications 180. Exemplary computing system 100 is controlled primarily by computer readable instructions, which may be in the form of software stored in a computer readable medium, such as a hard drive or memory. Such software may be executed within central processing unit (CPU) 130 to cause data processing system 100 to do work. In many known computer servers, workstations and personal computers central processing unit 130 is implemented by one or more micro-electronic chips called microprocessors. Coprocessor 140 is an optional processor, distinct from main CPU 130, that performs additional functions or assists CPU 130. One common type of coprocessor is the floating-point coprocessor, also called a numeric or math coprocessor, which is designed to perform numeric calculations faster and better than general-purpose CPU 130.

It is appreciated that although illustrative computing environment is shown to comprise a single CPU 130 that such description is merely illustrative as computing environment 100 may comprises a number of CPUs 130. Additionally computing environment 100 may exploit the resources of remote CPUs (not shown) through a communications network such as a switching fabric (not shown).

In operation, CPU 130 fetches, decodes, and executes instructions, and transfers information to and from other resources via the computer's main data-transfer path 125. Data-transfer path 125 can comprise a parallel system bus, or one or more point-to-point serial links called lanes. In the case of serial links, a hub (not shown) can act as a crossbar switch allowing point-to-point device interconnections to be rerouted on the fly. This dynamic point-to-point connection behavior can result in operations being performed simultaneously by system devices, since more than one pair of devices may communicate with each other at the same time. A plurality of such lanes can be grouped and coordinated to work together to provide higher bandwidth. The data-transfer path 125 connects the components in computing system 100 and provides the medium for data exchange. Data-transfer path 125 typically includes data lines or channels for sending data, address lines for sending addresses, and control lines for sending interrupts and control messages.

Memory devices coupled to system data-transfer path 125 include random access memory (RAM) 110 and read only memory (ROM) 115. Such memories include circuitry that allows information to be stored and retrieved. ROMs 115 generally contain stored data that cannot be modified. Data stored in RAM 110 can be read or changed by CPU 130 or other hardware devices. Access to RAM 110 and/or ROM 115 may be controlled by memory controller 105. Memory controller 105 may provide an address translation function that translates virtual addresses into physical addresses as instructions are executed. Memory controller 105 may also provide a memory protection function that isolates processes within the system.

In addition, computing system 100 may contain peripherals controller 145 responsible for communicating instructions from CPU 130 to peripherals, such as, printer 150, keyboard 155, mouse 160, and data storage device 165.

Display 170, which is controlled by display controller 175, is used to display visual output generated by computing system 100. Such visual output may include text, graphics, animated graphics, video, and the like. Display 170 may be implemented with a CRT-based video display, an LCD-based flat-panel display, gas plasma-based flat-panel display, or a touch-panel, for example. Display controller 175 includes electronic components required to generate a video signal that is sent to display 170.

Further, computing system 100 may contain network adapter 120 which may be used to connect computing system 100 to an external communication network 185. Communications network 185 may provide computer users with means of communicating and transferring software and information electronically. It will be appreciated that the network and other connections shown are exemplary and other means of establishing communications links between computers and computer components may be used.

Exemplary computer system 100 is merely illustrative of a portion of a computing environment in which the herein described systems and methods may operate, and does not limit the implementation of the herein described systems and methods in computing environments having differing components and configurations, as the concepts described herein may be implemented in various computing environments having various components and configurations.

Figure 2:
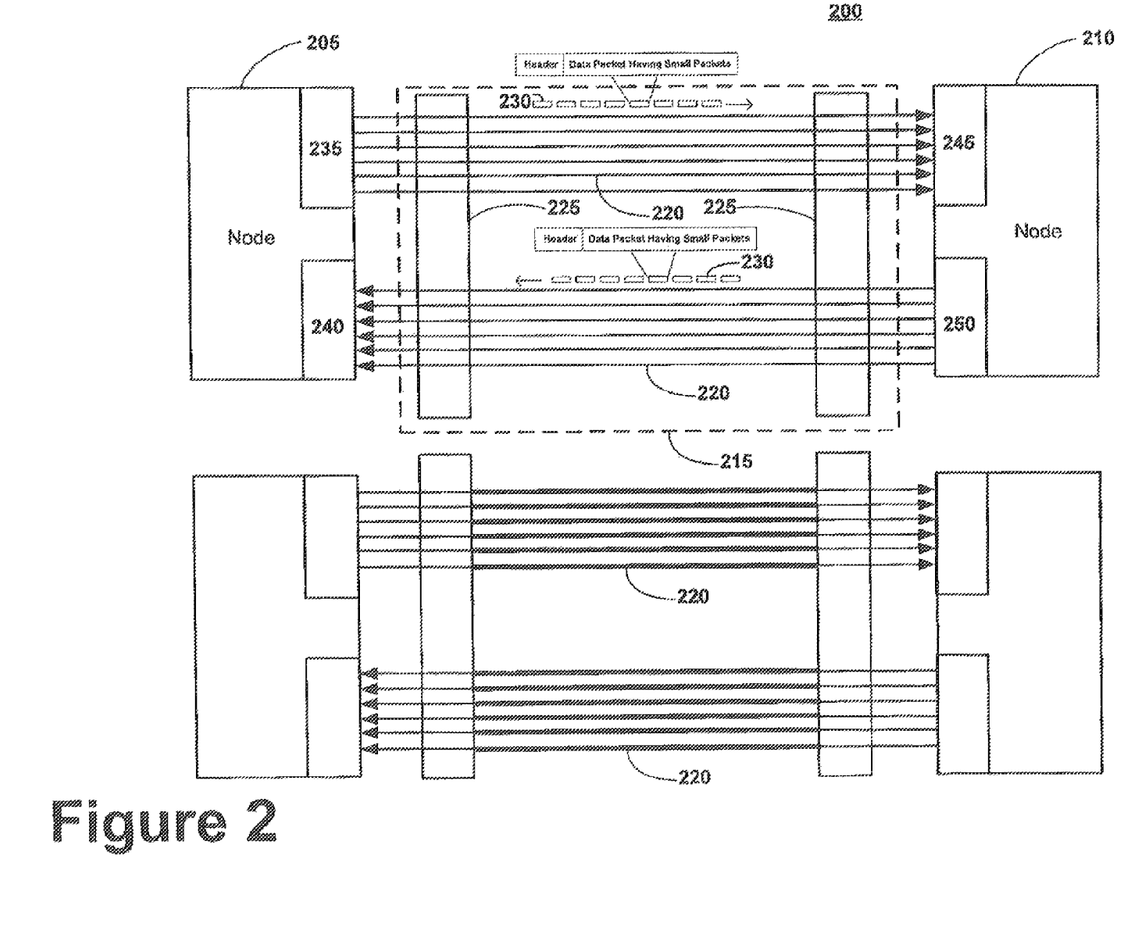
FIG. 2 is a block diagram showing the cooperation of exemplary components of an exemplary data communications architecture.

Data Communications Architecture:

FIG. 2 depicts a block diagram of an illustrative data communications architecture 200 for use in an exemplary computing environment. The illustrative data communications architecture may be implemented as components of the computing environment and may employ serializer and deserializer (SERDES) components. As shown in FIG. 2, data communications architecture 200 comprises nodes 205 and 210 cooperating to communicate data 230 over physical links 220. Nodes 205 and 210 are sources of data transactions, such as cache-processor interfaces (CPIs) and root complexes (RCs) of input/output (I/O) interfaces. Physical links 220 attach to nodes 205 and 210 through physical connectors 225.

In operation, the exemplary computing environment (not shown) cooperates with nodes 205 and 210 to communicate data between the nodes. In the illustrative implementation, the nodes may reside in disparate locations, such as different system boards or drawers, within the exemplary computing environment (not shown) or may reside as part of one of exemplary computing environment's system board (not shown). As is shown, data may be communicated in a particular direction, as indicated by the arrows on physical links 220 and data 230, between the nodes. Also, it is appreciated that physical links 220 are depicted having differing line thicknesses to indicate different physical link 220 media.

Furthermore, as is shown, dashed box 215 shows the establishment of two communication channels between nodes 205, 210. In the implementation provided, dashed box 215 is shown to comprise a pair of transmit-receive cores operating to communicate data. Specifically, data is processed by transmit core 235 of node 205 for communication through physical connector 225 and physical links 220 to receiving core 245 of node 210. Similarly, data may be processed for communication by transmit core 250 of node 210 to receiving core 240 of node 205. One of the communication channels is a request channel over which data is requested, and the other channel is a response channel, over which the requested data is provided. In an exemplary implementation, the transmit-receive core pairs may be aligned and trained to process data according to a selected serial encoding protocol such as eight-bit-ten-bit (8b10b) encoding.

Either node can act as either a requester or a responder, depending on the needs of the system. Further, as is shown in FIG. 2, data 230 may comprise a number of micropackets. Specifically, data 230 may contain a header portion and data portion. In operation, both data transactions and control messages for managing the latency of communicating the data transactions in accordance with the herein described methods may be communicated over exemplary data communications architecture 200 as data 230.

Partitionable Computer System

A multiprocessor computing system can be configured as a single operational environment, or can be partitioned into several independent operational environments. In this context, operational environment connotes hardware and software isolation, in which each partition is assigned memory, processors, and I/O resources for its own use, and executes its own operating system image. Partitions can be physical or logical mechanisms for demarcating separate operational environments within a single system, or can comprise multiple independently operable systems within a single operational environment. Partitioning allows the coordinated configuration and management of a large number of computing resources, allocation of computing resources in response to fluctuations in demand, maximizes resource use, and can protect disruptive events occurring in one partition from adversely affecting other partitions.

Figure 3A:
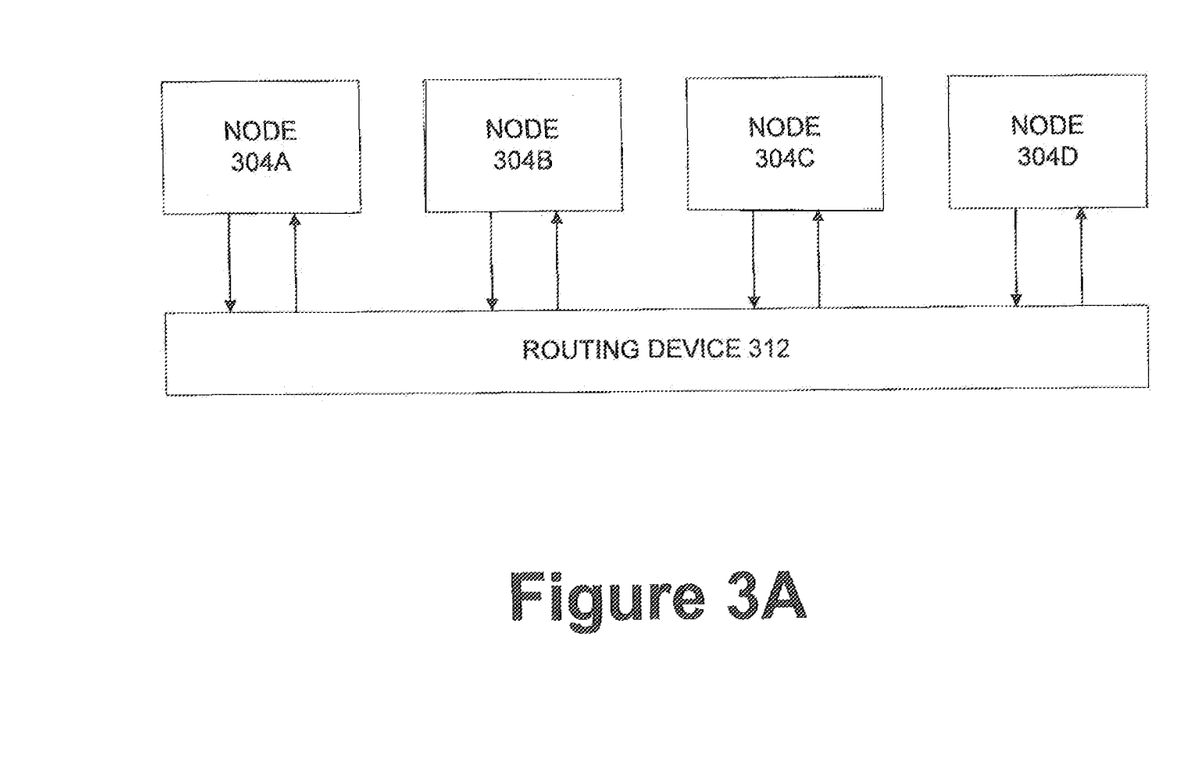
FIGS. 3A and 3B are block diagrams of various partitionable computing systems in which the principles of the herein described systems and methods can be used.

With reference to FIG. 3A, a portion of a computing system can comprise a number of transaction source nodes 304. In FIG. 3A, only four nodes 304A through 304D are present. The nodes may all be located in a single operating environment, or they may be located within two or more partitions of a partitionable computer system. Each node 304 can communicate with the others via a routing device 312 that can route data packets, such as a crossbar switch. The routing device 312 facilitates the transfer of packets from a source address to a destination address. For example, for node 304A to send a packet to node 304D, node 304A sends the packet to the routing device 312, the routing device 312 in turn transmits the packet to node 304D. In this context, the routing device can be referred to as a switching fabric.

Figure 3B:
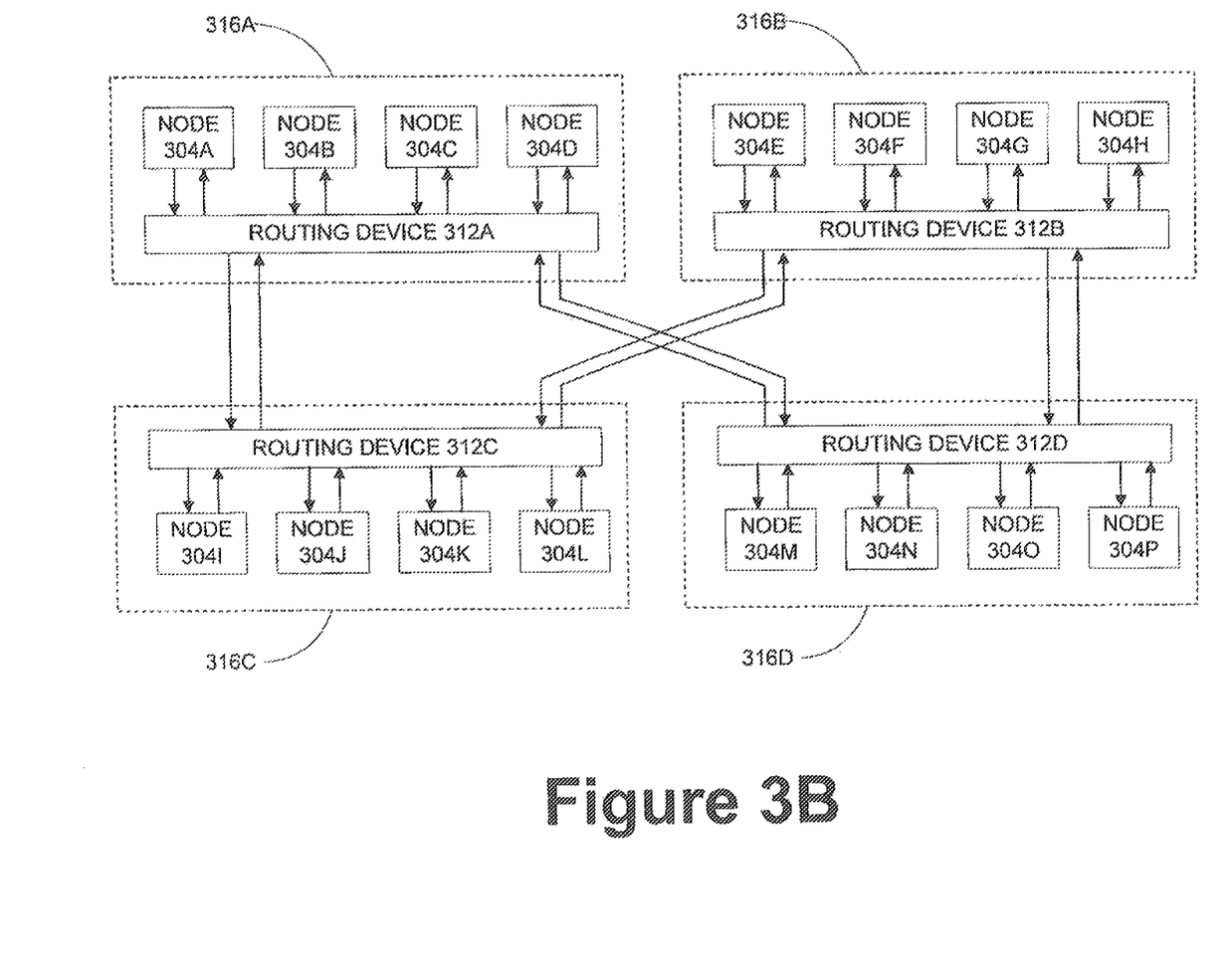

In a larger partitionable computing system, such as the system shown in FIG. 3B, there can be more than one routing device 312. For example. FIG. 3B shows a system with four routing devices 312A, 312B, 312C, and 312D, although it is appreciated that other types and/or numbers of routing devices can be used. Here, the routing devices 312 collectively can also be referred to as a switching fabric. The routing devices 312 can communicate with each other and with a number of nodes 304. For example, nodes 304A, 304B, 304C, and 304 D can communicate directly with routing device 312A. Nodes 304E, 304F, 304G, and 304H can communicate directly with routing device 312B. Nodes 304I, 304J, 304K, and 304L can communicate directly with routing device 312C. Nodes 304M, 304N, 304O, and 304P can communicate directly with routing device 312D. In such a configuration, each routing device 312 and the nodes 304 that the routing device 312 directly communicates with may be configured to be comprised in a separate partition, indicated by dashed lines 316. As shown, in FIG. 3B there are four partitions 316A, 316B, 316C and 316D. As shown, each partition includes four nodes; however, any number of nodes and combination of nodes can be included in a partition. For example, partitions 316A and 316B could be reconfigured and combined to form one partition containing all eight nodes. In another example, a system could be configured to include nodes 304A, 304B, 304M, and 304N in one partition, and the remaining nodes in one or more other partitions. Furthermore, partitions can be created, eliminated, and/or reconfigured dynamically in response to changing needs of the system.

Although shown in exemplary configurations, the organization of nodes and partitions is not limited to such configurations. Rather, the configurations shown are illustrations only, and the configuration of components in accordance with the claims is not intended to limited by the description provided.

Wall-Up Timeout Architecture

Timers are maintained by one or more nodes that are sources of transactions sent into the system fabric. The timers are used to establish a "wall-up" mode in the system that can stop or slow issuance of new transactions from all sources into the fabric until all outstanding coherent transactions are completed. The wall-up mode relieves traffic congestion on the fabric so that a transaction that is in danger of not completing due to the congestion can be completed. After the transaction is completed, the nodes return to normal operation.

Figure 4:
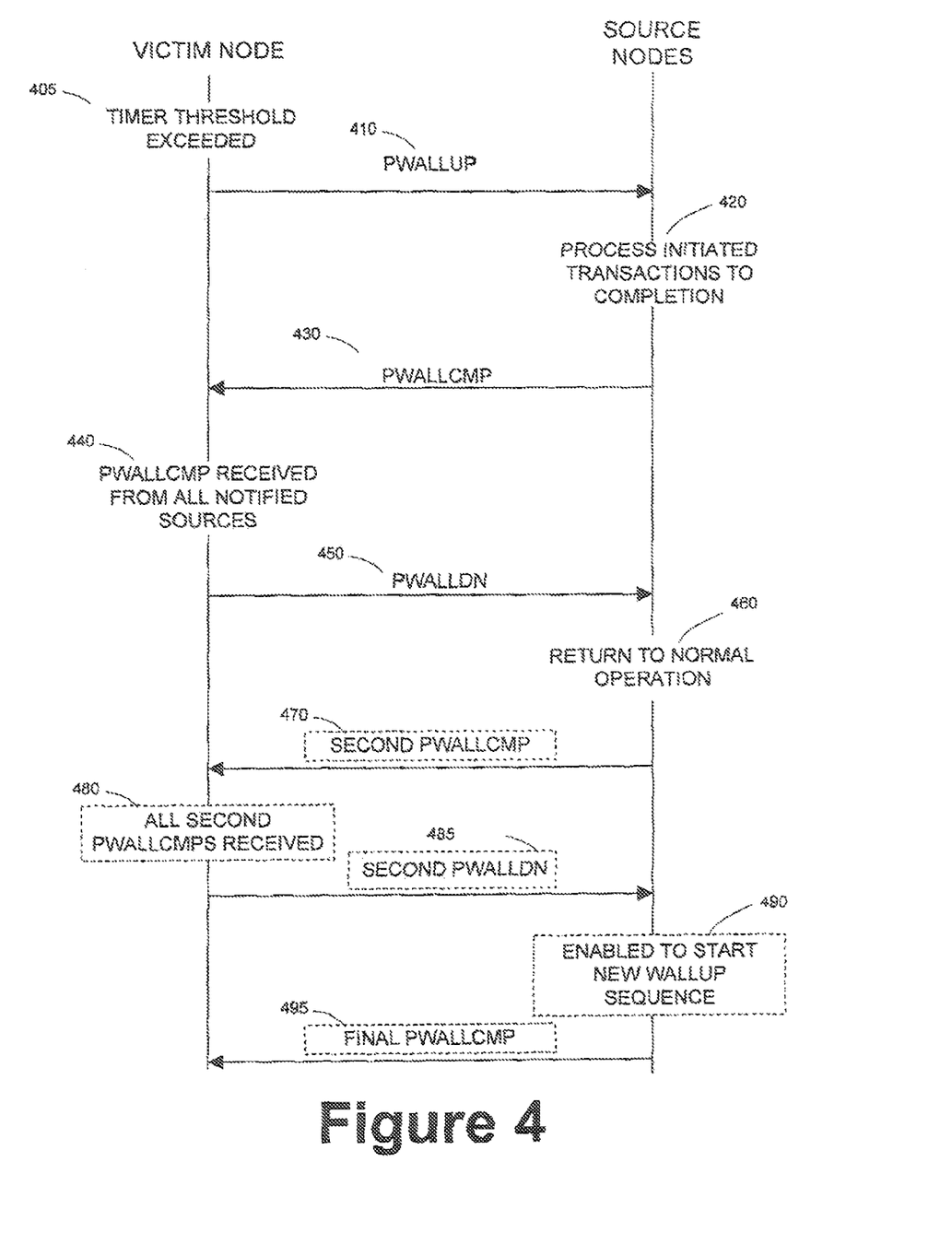
FIG. 4 is a diagram showing the processing performed by an exemplary data communications architecture when managing latency in communicating data, in accordance with an implementation of the herein described systems and methods.

FIG. 4 shown a diagram of the messages sent in the wall-up architecture. In an exemplary embodiment, some or all of the source nodes that introduce coherent transactions onto the fabric, including cache-processor interfaces (CPIs), and root complexes (RCs) of input/output (I/O) interfaces, maintain a "wall-up" timer for each outstanding coherent transaction they initiate. A source that initiates a particular coherent transaction is referred to herein as the "initiator" of the transaction, and the node to which the transaction is directed is referred to herein as the "target." If the wall-up timer associated with the transaction reaches a selected or predetermined threshold, the transaction is deemed in danger of not completing due to congestion on the fabric. The initiator of that transaction is referred to herein as a "victim." In order to timely complete the transaction, it is determined that the victim needs improved access to the target, such as by obtaining additional system bandwidth to the target. To obtain additional system bandwidth, the victim invokes the wall-up mode (raises the wall) by sending a PWALLUP message (410) to one or more, and preferably all, of the sources, such as by multicasting the PWALLUP to the sources. In an alternative implementation, the victim can request another source node to raise the wall on its behalf, depending on one or more select parameters. For example, the system can be configured such that CPIs are enabled to communicate with all potential wall-up participants, while RCs are not. In such a configuration, a victim that is an RC can send a message to a CPI to raise the wall on its behalf. It will be appreciated that other configurations are possible. Furthermore, if the computer system is partitionable, and if the target is in the same partition as the victim, the victim can be configured to send a PWALLUP message only to source nodes in that partition. The victim keeps track of the nodes to which PWALLUP messages were sent.

Responsive to receiving the PWALLUP message, the source nodes cease to initiate new transactions, while continuing to process ongoing and newly received transactions (420). In addition, the source nodes are disabled from starting their own new wall-up sequences. In an alternative implementation, one or more source nodes can continue to initiate new transactions in accordance with select parameters. For example, one or more RCs can be selected to continue to be enabled to initiate new transactions, such as for a select limited time. In another implementation, one or more CPIs can similarly be selected to continue to be enabled to initiate new transactions, such as for a limited time selected for the CPIs. In yet another implementation, a subset of source nodes including one or more of both RCs and CPIs can be selected to continue to be enabled to initiate new transactions, for the same amount of time, or for different times selected for the RCs and the CPIs, respectively. It is appreciated that other combinations of sources and respective parameters are also possible.

The CPIs stop the flow of new coherent traffic by quiescing their associated processors, including the initiator if it is a CPI. RCs stop the flow of new coherent traffic by stalling acceptance of new transactions from associated I/O interfaces, again including the initiator if it is an RC. In both cases, the source nodes continue to process the transactions that are already active or that were already received by the source nodes before the wall was brought up. In an exemplary implementation, when a source, such as an RC, becomes a victim (either the victim that raised the wall, or an RC with a timer that has reached a threshold value while the wall is up), the RC may continue to initiate new traffic until a safety timer reaches its threshold. A CPI can behave similarly. In order to prevent the wall from staying up too long, there can be included a safety timer associated with the processing of those additional already-received transactions, to ensure that they are timely processed.

To ensure timely completion of the transaction from the victim to the target, it must be determined that the transaction has made acceptable progress, for example, by progressing to a select point, such as to completion. That can be determined by confirming that all source nodes including the victim have completed their respective outstanding transactions. In the exemplary embodiment, once each source node that received a PWALLUP has completed all of its outstanding coherent transactions, it responds by sending a PWALLCMP message to the victim (430). The victim keeps track of the nodes from which it receives a PWALLCMP message. Once the victim has received a PWALLCMP from each source to which it had sent a PWALLUP message (440), and it has also completed all of its own outstanding transactions, the victim issues a PWALLDN message to the same source nodes (450). Those source nodes can then return to normal operation (460). The source nodes may be enabled to start new wall-up sequences.

Optionally (as indicated by the subsequent steps in FIG. 4 illustrated with dashed lines) the source nodes can send new transactions into the fabric, but are not yet enabled to initiate a new wall-up sequence. In this case, the source nodes respond by sending a second PWALLCMP message to the victim upon returning to normal operation (470). The wall-up timer does not reset yet, and any newly received PWALLUPs should be remembered (e.g., cached) but not yet acted upon.

Upon receiving the second PWALLCMPs for all of its outstanding PWALLDNs (480), the victim can issue a second sequence of PWALLDNs (485) as a mechanism to indicate to the source nodes that they can now re-enable age checking on their transactions for potentially issuing new PWALLUPs.

Each source node that received a PWALLUP returns to full normal operation once the second PWALLDN has been received (490). New PWALLUPs are enabled, i.e., the sources can either issue or act upon a new PWALLUP. The wall-up timer is reset, and the sources issue final PWALLCMPs to the victim (495).

Optionally, the victim may be configured to manage its own progression through the WALL algorithm by using the fabric to issue PWALLUP, PWALLCMP, and PWALLDN messages to itself.

It is possible that multiple nodes will issue PWALLUP messages at substantially the same time. In that event, one is designated as the "master." It is appreciated that this can be done in various ways, for example, by simply comparing the IDs of the source nodes that issued the PWALLUPs, and selecting the lowest one as the master. Source nodes that receive multiple PWALLUPs from different victims in the system can respond with a PWALLCMP to each. In an implementation, source nodes may be configured to respond early to PWALLUPs that do not originate from the master.

In the exemplary embodiment, a victim that has started a WALLOP sequence and that also receives a PWALLUP message from another node with a higher numbered ID, should respond to that higher numbered node with a PWALLCMP,M message to indicate that it (the lower numbered victim) will be the master. This ensures that the higher numbered node is aware of the masters PWALLUP before it could decide it is ready to issue a PWALLDN.

A victim that receives a PWALLCMP,M (which will be from a node with a lower numbered ID) must yield control of the wall-up mode to the master. In doing so, it may continue to issue PWALLUPs to complete its wall-up sequence. If so, it should also collect PWALLCMPs, so that it can recognize when its transactions are drained from the fabric, and can issue PWALLCMPs it owes to any other non-master victims. However, it will wait to issue a PWALLCMP to the master until it has first received all of its own PWALLCMPs, and it will not issue any PWALLDN messages. Only one master is recognized at a time.

In an implementation, a system state machine can have a "wall-down" timer that, upon reaching a select threshold, brings down the wall (per transaction source, initiator or target). This is used to bring down the wall in the event of an operating system crash when the wall is up. The purpose of this timer is to allow information to be gathered about the system state at the time of the crash, so the timer should be independent of the OS. In this implementation, the PWALLUP and PWALLDN messages should also be sent to the state machine. The wall-down timer begins counting when a PWALLUP is received, and resets when the first PWALLDN is received.

Various modifications and variations can be made to the disclosed embodiments without departing from the spirit or scope of the invention. Thus, it is intended that modifications and variations of this disclosure be protected provided they come within the scope of the appended claims and their equivalents.

What is claimed is:

1. In a computer system comprising a plurality of source nodes able to intercommunicate via a system switching fabric by introducing transactions onto the fabric, a method of managing the latency of internode communications, the method comprising:
    initiating communication of a first transaction from an initiator source node to a target source node;
    determining that the initiator node needs additional system bandwidth to the target node to timely complete the first transaction;
    notifying a plurality of source nodes that the initiator node needs additional system bandwidth; responsive to receiving the notification, stopping the introduction of new transactions onto the system fabric by at least some of the notified nodes;
    continuing the communication of the first transaction from the initiator node to the target node; determining that the first transaction has progressed to a preselected point;
    indicating to the notified nodes that the initiator node no longer needs additional system bandwidth; and
    responsive to receiving the indication, ceasing to stop the introduction of new transactions onto the system fabric by the notified nodes,
    whereby the latency of the communication of the first transaction from the initiator node to the target node is managed.

2. The method of claim 1, further comprising, in conjunction with the initiating communication step, starting a transaction timer, wherein the step of determining that the initiator node needs additional system bandwidth to the target node includes determining that the transaction timer has reached a select threshold.

3. The method of claim 1, wherein the notifying step includes the initiator node sending a message (PWALLUP) to the plurality of source nodes that they should stop introducing new transactions onto the system fabric.

4. The method of claim 1, wherein the step of determining that the first transaction has progressed to a select point further includes determining that all of the notified nodes' transactions have progressed to respective select points.

5. The method of claim 4, further comprising receiving by the initiator a message (PWALLCMP) from each of the notified nodes that their transactions have progressed to respective select points.

6. The method of claim 1, wherein the computer system is a partitionable computer system,
    wherein the notifying step includes the initiator node multicasting a message (PWALLUP) to all source nodes of the partition indicating that said nodes should stop introducing new transactions onto the system fabric, and
    wherein the step of determining that the first transaction has progressed to a select point includes receiving a message (PWALLCMP) from each of the notified nodes that their transactions have progressed to respective select points.

7. The method of claim 6, wherein the step of indicating that the initiator node no longer needs additional bandwidth includes the initiator no multicasting a message (PWALLDN) to all of the said source nodes of the partition, indicating that the initiator node has received a PWALLCMP from each said source node.

8. The method of claim 7, further comprising said source nodes returning to normal operation responsive to receiving their respective PWALLDNs.

9. The method of claim 8, further comprising:
    a second initiator multicasting a second PWALLUP to all of the said source nodes in the partition while the first initiator is multicasting the first PWALLUP; and
    selecting one of the initiators as a master and notifying the other, non-master initiator of the selection, wherein the PWALLDN is sent by the master, and the non-master initiator does not issue any PWALLDNs.

10. The method of claim 9, further comprising the non-master initiator waiting to issue a PWALLCMP to the master until it has received all of its own PWALLCMPs.

11. A system comprising a non-transitory computer readable medium encoded with instructions which, when executed by processors of a plurality of source nodes able to intercommunicate via a system switching fabric by introducing transactions onto the fabric, cause the computing system to perform a method to manage the latency of internode communications, the method comprising:

initiating communication of a first transaction from an initiator source node to a target source node;
determining that the initiator node needs additional system bandwidth to the target node to timely complete the first transaction;
notifying a plurality of source nodes including the initiator node, the target node, and at least one third source node, that the initiator node needs additional system bandwidth;
responsive to receiving the notification, stopping the introduction of new transactions onto the system fabric by at least some of the notified nodes;
continuing the communication of the first transaction from the initiator node to the target node;
determining that the first transaction has progressed to a select point;
indicating to the notified nodes that the initiator node no longer needs additional system bandwidth; and
responsive to receiving the indication, ceasing to stop the introduction of new transactions onto the system fabric by the notified nodes,
whereby the latency of the communication of the first transaction from the initiator node to the target node is managed.

12. A system as recited in claim 1 wherein:
the initiating is by the initiator source node;
the determining that the initiator node needs additional system bandwidth is by the initiator source;
the notifying is in response to the determining that the initiator node needs additional system bandwidth;
determining that the first transaction has progressed to a select point is by the initiator node; and
the indicating is in response to the determining that the first transaction has progressed to a select point is by the initiator node.

13. A system as recited in claim 11 wherein:
the initiating is by the initiator source node;
the determining that the initiator node needs additional system bandwidth is by the initiator source;
the notifying is in response to the determining that the initiator node needs additional system bandwidth;
determining that the first transaction has progressed to a select point is by the initiator node; and
the indicating is in response to the determining that the first transaction has progressed to a select point is by the initiator node.

* * * * *

UNITED STATES PATENT AND TRADEMARK OFFICE
CERTIFICATE OF CORRECTION

PATENT NO.       : 8,732,331 B2
APPLICATION NO.  : 13/122331
DATED            : May 20, 2014
INVENTOR(S)      : Gregg B Lesartre et al.

It is certified that error appears in the above-identified patent and that said Letters Patent is hereby corrected as shown below:

In the Claims

In column 8, line 43, in Claim 7, delete "no" and insert -- node --, therefor.

Signed and Sealed this
Seventh Day of October, 2014

Michelle K. Lee
*Deputy Director of the United States Patent and Trademark Office*